March 28, 1933. C. T. THORSSELL 1,903,073
PROCESS FOR THE PRODUCTION OF SODA AND POTASSIUM HYDROXIDE
Original Filed July 3, 1930
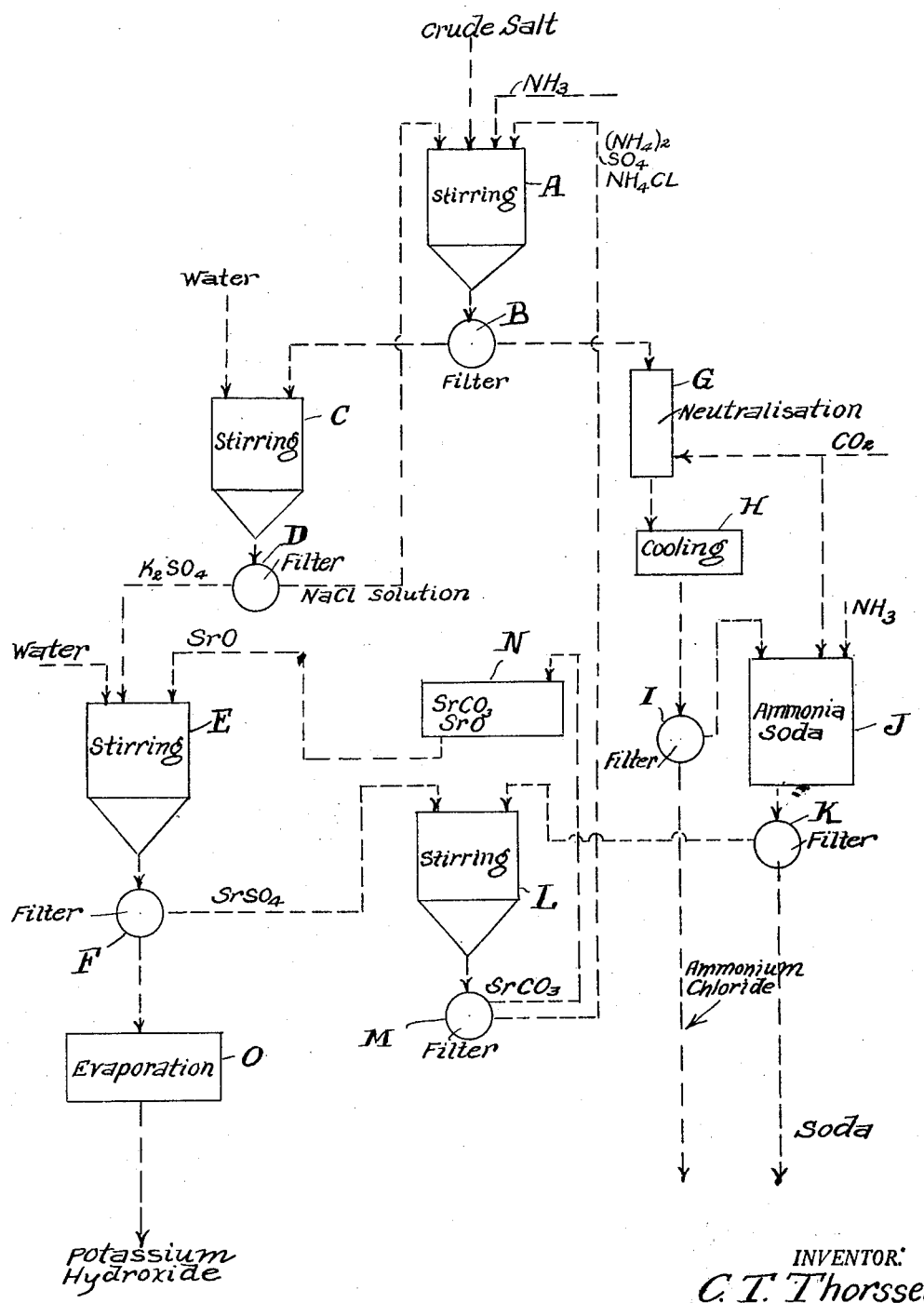
INVENTOR:
C. T. Thorssell
BY Marks & Clerk
ATTORNEYS.

Patented Mar. 28, 1933

1,903,073

UNITED STATES PATENT OFFICE

CARL THEODOR THORSSELL, OF KASSEL, GERMANY

PROCESS FOR THE PRODUCTION OF SODA AND POTASSIUM HYDROXIDE

Original application filed July 3, 1930, Serial No. 465,793, and in Germany July 13, 1929. Divided and this application filed June 24, 1931. Serial No. 546,673.

It is known to produce potassium hydroxide by the decomposition of potassium sulfate and alkaline-earth hydrate.

This reaction is very advantageously utilized according to the present invention for the purpose of working up sylvinitic crude potassium salt to soda and potassium hydroxide.

A process has previously been described by which soda and potassium sulfate are made from sylvinite by stirring alkaline-earth sulfate in a solution containing ammonium chloride and ammonium bicarbonate obtained when carrying out the process, separating the alkaline-earth carbonate formed and adding sylvinite to the liquor obtained. The mixture of glaserite and potassium chloride separated as a precipitate is decomposed by water to potassium sulfate. The free ammonia is removed from the combined mother liquors and a part of the ammonium chloride is separated by cooling whereupon the liquor thus obtained is worked up to soda according to the ammonia-soda-process; the solution containing the above mentioned ammonium chloride and ammonium bicarbonate thus being formed.

In the process according to the present invention, sulfuric acid and alkaline earth are kept constantly in circulation so that always new quantities of potassium sulfate are produced from the crude salt, the said potassium sulfate being decomposed to potassium hydroxide with the alkaline-earth hydrate which is also recovered.

Strontium hydrate is particularly adapted for this process. Barium hydrate may also be used in the same manner. However, barium hydrate is less suitable than strontium hydrate for the process according to the present invention in consequence of the very low solubility of barium sulfate.

The process is carried out as follows:

Strontium sulfate is stirred into a solution containing ammonium chloride and ammonium bicarbonate obtained when carrying out the process and it reacts with the ammonium bicarbonate in the solution to form ammonium sulfate and strontium carbonate. The latter is separated and the liquor is stirred up with sylvinite by introducing ammonia. Glaserite and potassium chloride are formed as a precipitate which, after separating the liquor, is treated with water, potassium sulfate and a solution of sodium chloride being formed. The latter goes back into the process. The liquor, which is freed from glaserite and potassium chloride and chiefly contains sodium chloride and ammonium chloride, is cooled for the purpose of separating a part of the ammonium chloride whereupon it is suitable for the ammonia-soda-process. After treating this liquor with ammonia and carbonic acid in accordance with the ammonia-soda-process and separating the sodium bicarbonate formed, the above-mentioned liquor containing ammonium chloride and ammonium bicarbonate is obtained with which the strontium sulfate is stirred up. The strontium carbonate obtained is converted according to known processes into strontium oxide and strontium hydroxide respectively and is treated with the likewise obtained potassium sulfate and water, a solution of potassium hydroxide and strontium sulfate being obtained. Pure potassium hydroxide is separated from the solution by evaporation.

In order to obtain the solution of potassium hydroxide substantially free from potassium sulfate, the reaction may be effected with strontium hydrate in excess and the strontium hydrate contained in the solution of potassium hydroxide may subsequently be precipitated with potash as carbonate.

Sylvinite, carbonic acid and ammonia serve as raw materials. Soda, potassium hydroxide and ammonium chloride are formed as products. If desired, the ammonia may be eliminated as a raw material—except when it is added for covering the usual losses of ammonia—since it is obtained again by expulsion from ammonium chloride and in the same manner as is usual in the manufacture of soda in which case, therfore, only soda and potassium hydroxide are obtained.

Description of flow sheet

A liquor coming from the process and chiefly containing ammonium sulfate and ammonium chloride is stirred up with crude salt (sylvinite) in the vessel A and ammonia is introduced. The precipitate consisting of glaserite and potassium chloride is filtered off in the filter B and stirred up with water in the vessel C whereby potassium sulfate and a solution of sodium chloride are obtained. The potassium sulfate is separated in the filter D from the solution which returns to the process. The potassium sulfate is stirred up with water and strontium hydrate in the vessel E whereby strontium sulfate and a solution of potassium hydroxide are obtained. The strontium sulfate is separated in the filter F and the solution obtained is further worked by evaporation in vessel O to solid potassium hydroxide or a strong solution of potassium hydroxide.

The solution separated in the filter B and consisting of ammonium chloride, sodium chloride and free ammonia is neutralized with carbonic acid in G and cooled in the cooler H for the purpose of separating a portion of the ammonium chloride contained therein, the latter being separated in the filter I or precipitated as product or regenerated. The mother liquor is treated in accordance with the ammonia-soda-process in vessel J and the sodium bicarbonate which is obtained is filtered off in K. The mother liquor therefrom, which now chiefly contains ammonium chloride and ammonium bicarbonate is stirred up in the vessel L with the strontium sulfate from the filter F, the strontium sulfate being converted into strontium carbonate and ammonium sulfate. The strontium carbonate is separated from the liquor in the filter M and passes to vessel N to be worked into strontium oxide which is transferred to vessel E. This liquor is the solution referred to at the outset and chiefly containing ammonium sulfate and ammonium chloride, the said solution passing to the vessel A for stirring up further quantities of crude salt.

This application is a division of my co-pending application Serial No. 465,793, filed July 3, 1930.

I claim:

A process of producing soda and potassium hydroxide while simultaneously obtaining ammonium chloride from sylvinitic crude potassium salts, ammonia and carbonic acid by passing alkaline-earth sulfate in a cyclic process through the following stages: First, a solution containing ammonium chloride and ammonium bicarbonate obtained when carrying out the process is stirred up with alkaline-earth sulfate also obtained during the process and separating the alkaline-earth carbonate formed; second, the mother liquor obtained from the first stage is then stirred up with sylvinitic crude potassium salt and ammonia added whereupon the resulting precipitate consisting of glaserite and potassium chloride is separated and decomposed with cold water to potassium sulfate; third, the mother liquors obtained from the second stage are combined and the free ammonia removed, whereupon the mother liquors are cooled for the purpose of separating a part of the ammonium chloride contained therein; fourth, the remaining mother liquor is worked up into sodium bicarbonate and soda respectively according to the ammonia-soda-process, whereby the solution containing the ammonium chloride and ammonium bicarbonate indicated in the first step is formed; fifth, the alkaline-earth carbonate obtained from the first stage is converted into alkaline-earth oxide and alkaline-earth hydroxide respectively according to known processes and decomposed in water with the potassium sulfate, obtained from the second stage, whereby a solution of potassium hydroxide and alkaline-earth sulfate is obtained, and finally the separated alkaline-earth sulfate is treated, as in the first stage, and potassium hydroxide is obtained from the solution by evaporation.

In testimony whereof I affix my signature.

CARL THEODOR THORSSELL.